United States Patent
Lalam et al.

(10) Patent No.: US 11,451,630 B2
(45) Date of Patent: Sep. 20, 2022

(54) METHOD FOR DETERMINING A TEMPORAL REFERENCE AND/OR AT LEAST ONE SPATIAL REFERENCE IN A COMMUNICATION SYSTEM

(71) Applicant: SAGEMCOM BROADBAND SAS, Rueil Malmaison (FR)

(72) Inventors: Massinissa Lalam, Rueil Malmaison (FR); Thierry Lestable, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/064,556

(22) PCT Filed: Dec. 15, 2016

(86) PCT No.: PCT/EP2016/081275
§ 371 (c)(1),
(2) Date: Jun. 21, 2018

(87) PCT Pub. No.: WO2017/108585
PCT Pub. Date: Jun. 29, 2017

(65) Prior Publication Data
US 2019/0007497 A1    Jan. 3, 2019

(30) Foreign Application Priority Data

Dec. 23, 2015 (FR) ...................................... 1563197

(51) Int. Cl.
*H04L 67/12* (2022.01)
*H04W 4/38* (2018.01)
(Continued)

(52) U.S. Cl.
CPC ............ *H04L 67/12* (2013.01); *G01S 5/0045* (2013.01); *G01S 5/0063* (2013.01); *G01S 5/0236* (2013.01);
(Continued)

(58) Field of Classification Search
CPC ....... H04W 4/80; H04W 88/16; H04W 4/023; H04W 4/06; H04W 4/029; H04W 72/085;
(Continued)

(56) References Cited

U.S. PATENT DOCUMENTS 7,925,514 B2 * 4/2011 Williams ............. G06Q 10/047
                                                     705/1.1
9,846,911 B1 * 12/2017 Burks .................... G06Q 40/08
(Continued)

OTHER PUBLICATIONS

International Search Report and Written Opinion of the ISA for PCT/EP2016/081275, dated Mar. 14, 2017, 15 pages.
(Continued)

*Primary Examiner* — Ninos Donabed
(74) *Attorney, Agent, or Firm* — Nixon & Vanderhye, P.C.

(57) ABSTRACT

For determining a temporal reference and/or at least one spatial reference, in a communication system comprising a plurality of gathering gateways configured to transmit beacons, a device performs for each beacon: obtaining (502) therefrom information on current geolocation of the gathering gateway that transmitted said beacon; obtaining (503) therefrom information representing a communication technology used for determining said current geolocation; and obtaining (504) therefrom information indicating whether said current geolocation was determined by internal means or by external means. The device then uses (509) the information thus obtained for determining the temporal reference for synchronizing in time and frequency said
(Continued)

device and/or the spatial reference or references for determining the geolocation of said device.

17 Claims, 5 Drawing Sheets (51) Int. Cl.
G01S 19/48 (2010.01)
G01S 5/00 (2006.01)
G01S 5/02 (2010.01)
H04J 3/06 (2006.01)

(52) U.S. Cl.
CPC .......... *G01S 5/0257* (2013.01); *G01S 5/0263* (2013.01); *G01S 19/48* (2013.01); *H04J 3/0635* (2013.01); *H04J 3/0638* (2013.01); *H04W 4/38* (2018.02)

(58) Field of Classification Search
CPC .. H04W 76/40; H04W 12/08; G06Q 30/0267; G06Q 30/0268; G06Q 10/0833; G06Q 30/0241; H04L 67/2842; H04L 67/42; H04L 67/12
See application file for complete search history.

(56) References Cited

U.S. PATENT DOCUMENTS

| | | | | |
|---|---|---|---|---|
| 10,178,533 | B2* | 1/2019 | Saldin | G08B 25/008 |
| 10,210,353 | B1* | 2/2019 | Li | G06K 7/0008 |
| 2006/0181411 | A1* | 8/2006 | Fast | G01S 5/02 |
| | | | | 340/539.13 |
| 2006/0256009 | A1* | 11/2006 | Wengler | H04B 7/0854 |
| | | | | 342/378 |
| 2007/0198174 | A1* | 8/2007 | Williams | G06Q 10/08 |
| | | | | 340/995.19 |
| 2011/0028166 | A1 | 2/2011 | Ketchum et al. | |
| 2013/0282357 | A1* | 10/2013 | Rubin | G08G 1/096791 |
| | | | | 703/22 |
| 2013/0283348 | A1* | 10/2013 | Garrett | H04L 63/10 |
| | | | | 726/3 |
| 2014/0310243 | A1* | 10/2014 | McGee | G06Q 10/101 |
| | | | | 707/639 |
| 2015/0181384 | A1* | 6/2015 | Mayor | H04W 24/02 |
| | | | | 455/456.1 |
| 2015/0319554 | A1* | 11/2015 | Blanche | H04W 4/80 |
| | | | | 455/41.2 |
| 2016/0227162 | A1* | 8/2016 | Bargetzi | G06Q 10/1095 |
| 2016/0351036 | A1* | 12/2016 | Saldin | G08B 25/008 |
| 2017/0011429 | A1* | 1/2017 | Walden | H04W 72/085 |
| 2018/0018618 | A1* | 1/2018 | Groseclose | G06Q 10/08 |
| 2018/0077523 | A1* | 3/2018 | Herrera | H04W 4/029 |
| 2018/0109928 | A1* | 4/2018 | Walden | G06T 7/70 |

OTHER PUBLICATIONS

Sornin et al., "LoRa Specification V1.0", LoRa Alliance Inc., Jan. 31, 2015, 82 pages.

* cited by examiner

METHOD FOR DETERMINING A TEMPORAL REFERENCE AND/OR AT LEAST ONE SPATIAL REFERENCE IN A COMMUNICATION SYSTEM

This application is the U.S. national phase of International Application No. PCT/EP2016/081275 filed 15 Dec. 2016 which designated the U.S. and claims priority to FI Patent Application No. 15/63197 filed 23 Dec. 2015, the entire contents of each of which are hereby incorporated by reference.

The present invention relates to determining a temporal reference for time and frequency synchronisation of a device vis-à-vis a communication system and/or one or more spatial references for determining a geolocation of said device.

The Internet of Things is emerging. The Internet of Things represents the extension of the Internet to things and to places in the physical world. Whereas the Internet does not normally extend beyond the electronic world, the Internet of Things represents exchanges of information and data coming from devices present in the real world to the Internet, such as for example for performing a gathering of electrical-consumption or water-consumption readings. The Internet of Things is considered to be the third evolution of the Internet, dubbed Web 3.0. The Internet of Things is partly responsible for the current increase in the volume of data to be transmitted and stored, and thus gives rise to what is called "Big Data". The Internet of Things assumes a universal character for designating objects connected to varied uses, for example in the industrial, food, e-health or home automation fields.

To enable communicating objects to communicate in the context of the Internet of Things, gathering gateways situated at geographically high points are deployed by an operator. Apart from maintenance operations, these gateways are typically fixed and permanent. Mention can for example be made, on this model, of the SigFox or ThingPark networks. These gathering gateways communicate with the communicating objects thanks to medium- or long-range radio communication systems of the LPWAN (Low-Power Wide Area Network) type, such as for example the LoRa (registered trade mark) technology, which is the abbreviation for Long Range. These gateways thus serve as relays between the communicating objects and a server (core network) configured to process information sent by the communicating objects and optionally to control said communicating objects.

One property that is often sought in medium- or long-range ratio communication systems of the LPWAN type is the possibility of enabling equipment, communicating objects or gathering gateways to be geographically located (geolocated).

One known solution for these two objectives consists of adding, to each item of equipment in question, a satellite navigation system chip (GNSS or "Global Navigation Satellite System"), such as GPS (Global Positioning System), thus enabling said equipment to determine its position. This information can then be sent to the server (core network) thanks to the LPWAN communication technology. The cost of adding such a chip is however not insignificant, both from the financial point of view and from an energy consumption point of view.

It is also possible to rely on radio signals exchanged in the context of the LPWAN communication technology in order to use location techniques based on radio signal propagation information, for example techniques of the DRSS (Differential Received Signal Strength) or TDOA (Time Difference of Arrival) type. Indeed, the gathering gateways in medium- or long-range radio communication systems of the LPWAN type typically insert, in synchronisation beacons transmitted periodically, geographical coordinates (longitude, latitude) of respective antennas of said gathering gateways, which provides spatial references to enable geolocation of other items of equipment. There does however remain doubt as to the reliability of these geographical coordinates.

In addition, in the context of LPWAN communication technology, as in other communication networks, it is desirable or even necessary to share a common temporal reference. The beacons mentioned above enable other items of equipment, communicating objects or gathering gateways to synchronise themselves (to compensate for any clock drifts, in time and frequency. There does however here also remain doubt as to the reliability of these beacons as temporal references.

It is desirable to overcome these drawbacks of the prior art. It is in particular desirable to provide a solution that enables equipment, in a wireless communication network, particularly of the LPWAN type, in which gathering gateways transmit synchronisation beacons including geographical coordinate information on respective antennas of said gathering gateways, to determine a temporal reference and/or at least one spatial reference on which to rely for respectively performing time and frequency synchronisation of said equipment via the wireless communication network and/or to perform geolocation of said equipment.

The invention relates to a method for determining a temporal reference and/or at least one spatial reference, by a device in a communication system comprising a plurality of gathering gateways adapted for communicating with wireless communication terminal devices, each of the gathering gateways being configured to transmit so-called synchronisation beacons in the communication system. For each beacon or succession of beacons in a plurality of beacons or succession of beacons respectively received from separate gathering gateways, said device performs the following steps: parsing said beacon or succession of beacons and obtaining therefrom current geolocation information on the gathering gateway that transmitted said beacon or succession of beacons; parsing said beacon or succession of beacons and obtaining therefrom information representing a communication technology used for determining the current geolocation of the gathering gateway that transmitted said beacon or succession of beacons; parsing said beacon or succession of beacons and obtaining therefrom information indicating whether the current geolocation of the gathering gateway that transmitted said beacon or succession of beacons has been determined thanks to means internal to said gathering gateway, or whether the current geolocation of the gathering gateway that transmitted said beacon or succession of beacons was determined thanks to means external to said gathering gateway. Then the device uses the information thus obtained for determining the temporal reference for synchronizing in time and frequency said device vis-à-vis said communication system and/or the spatial reference or references for determining the geolocation of said device.

According to a particular embodiment, for each beacon or succession of beacons in said plurality of beacons, said device further performs the following step: parsing said beacon or succession of beacons and obtaining therefrom information representing a resolution algorithm for determining the current geolocation of the gathering gateway that transmitted said beacon or succession of beacons. In addition, the device also uses said information thus obtained for determining the temporal reference for synchronizing in time and frequency said device vis-à-vis said communication system and/or the spatial reference or references for determining the geolocation of said device.

According to a particular embodiment, for each beacon or succession of beacons in said plurality of beacons, said device further performs the following step: parsing said beacon or succession of beacons and obtaining therefrom information representing an instant at which the current geolocation of the gathering gateway that transmitted said beacon or succession of beacons was determined. In addition, the device also uses said information thus obtained for determining the temporal reference for synchronizing in time and frequency said device vis-à-vis said communication system and/or the spatial reference or references for determining the geolocation of said device.

According to a particular embodiment, for each beacon or succession of beacons in said plurality of beacons, said device further performs the following step: parsing said beacon or succession of beacons and obtaining therefrom information representing any difference between the current geolocation of the gathering gateway that transmitted said beacon or succession of beacons and a previous geolocation of said gathering gateway. In addition, the device also uses said information thus obtained for determining the temporal reference for synchronizing in time and frequency said device vis-à-vis said communication system and/or the spatial reference or references for determining the geolocation of said device.

According to a particular embodiment, for each beacon or succession of beacons in said plurality of beacons, said device further performs the following step: parsing said beacon or succession of beacons and obtaining therefrom information representing a mean uncertainty in geolocation vis-à-vis the gathering gateway that transmitted said beacon or succession of beacons. In addition, the device also uses said information thus obtained for determining the temporal reference for synchronizing in time and frequency said device vis-à-vis said communication system and/or the spatial reference or references for determining the geolocation of said device.

According to a particular embodiment, for each beacon or succession of beacons in said plurality of beacons, said device further performs the following step: parsing said beacon or succession of beacons and obtaining therefrom an indicator of convergence of the geographical coordinates of the gathering gateway that transmitted said beacon or succession of beacons. In addition, the device also uses said information thus obtained for determining the temporal reference for synchronizing in time and frequency said device vis-à-vis said communication system and/or the spatial reference or references for determining the geolocation of said device.

According to a particular embodiment, at least one beacon or succession of beacons in said plurality of beacons or respectively successions of beacons is received from a gathering gateway in another co-located communication system.

According to a particular embodiment, the device determines information on convergence of the geolocation broadcast in said beacon or succession of beacons in question and performs a filtering of the beacons according to the determined convergence information.

According to a particular embodiment, the device performs a classification of the beacons in a list according to a set of predefined rules, and the device retains a predetermined quantity N of beacons or succession of beacons at the top of the list in order to determine the temporal reference for synchronising in time and frequency said device vis-à-vis said communication system and/or the spatial reference or references for determining the geolocation of said device.

According to a particular embodiment, the device applies a weighting factor to each retained beacon or succession of beacons for determining the temporal reference for synchronising in time and frequency said device vis-à-vis said communication system.

According to a particular embodiment, each beacon received from a gathering gateway, the current geolocation of which was obtained thanks to a GPS chip, is weighted by the following weighting factor:

$$\alpha_m(1-\alpha_i\text{-Loc\_Intern}+2.\alpha_i.\text{Loc\_Intern})(1-\alpha_c\text{-Loc\_Conv}+2.\alpha_c.\text{Loc\_Conv})$$

and each other beacon is weighted by the following weighting factor:

$$\beta_m(1-\beta_i\text{-Loc\_Intern}+2.\beta_i.\text{Loc\_Intern})(1-\beta_c\text{-Loc\_Conv}+2.\beta_c.\text{Loc\_Conv})$$

where $\alpha_m$, $\alpha_i$, $\alpha_c$, $\beta_m$, $\beta_i$ and $\beta_c$ are weighting coefficients such that:

$\alpha_m > \beta_m$;
$\alpha_i > 0.5$ and $\beta_i > 0.5$;
$\alpha_c > 0.5$ and $\beta_c > 0.5$;

where Loc_Intern is equal to 1 when said current geolocation has been determined thanks to means internal to said gathering gateway and is equal to 0 when said current geolocation was determined thanks to means external to said gathering gateway, and where Loc_Conv is used as an indicator of convergence of the geographical coordinates of the gathering gateway that transmitted said beacon or succession of beacons, Loc_Conv being equal to 1 when the difference in absolute value between the current geolocation of said gathering gateway and a previous geolocation of said gathering gateway is less than or equal to a mean uncertainty as to geolocation vis-à-vis the gathering gateway, and is equal to 0 otherwise.

The invention also relates to a device configured to determine a temporal reference and/or at least one spatial reference, the device being intended to be included in a communication system further comprising a plurality of gathering gateways adapted for communicating with terminal devices by wireless communications, each of the gathering gateways being configured to transmit so-called synchronisation beacons in the communication system. The device implements, for each beacon or succession of beacons in a plurality of beacons or succession of beacons respectively received from distinct gathering gateways: means for parsing said beacon or succession of beacons and obtaining therefrom current geolocation information on the gathering gateway that transmitted said beacon or succession of beacons; means for parsing said beacon or succession of beacons and obtaining therefrom information representing a communication technology used for determining the current geolocation of the gathering gateway that transmitted said beacon or succession of beacons; means for parsing said beacon or succession of beacons and obtaining therefrom information indicating whether the current geolocation of the gathering gateway that transmitted said beacon or succession of beacons has been determined thanks to means internal to said gathering gateway, or whether the current geolocation of the gathering gateway that transmitted said beacon or succession of beacons was determined thanks to means external to said gathering gateway. Said device is then configured to use the information thus obtained for determining the temporal reference for synchronizing in time and frequency said device vis-à-vis said communication system and/or the spatial reference or references for determining the geolocation of said device.

The invention also relates to a method for enabling a device to determine a temporal reference and/or at least one spatial reference, via a gathering gateway of a communication system comprising a plurality of such gathering gateways adapted for communicating with terminal devices by wireless communications, each of the gathering gateways transmitting so-called synchronisation beacons in the communication system. The method is such that said gathering gateway performs the following steps: obtaining information on the current geolocation of said gathering gateway; obtaining information representing a communication technology used for determining the current geolocation of said gathering gateway; obtaining information indicating whether the current geolocation of the gathering gateway was determined thanks to means internal to said gathering gateway, or whether the current geolocation of said gathering gateway was determined thanks to means external to said gathering gateway. Said gathering gateway then transmits the information thus obtained in a beacon or a succession of beacons.

The invention also relates to a gathering gateway configured to enable a device to determine a temporal reference and/or at least one spatial reference, the gathering gateway being intended to be included in a communication system comprising a plurality of such gathering gateways adapted for communicating with terminal devices by wireless communications, each of the gathering gateways being configured to transmit so-called synchronisation beacons in the communication system. Said gathering gateway is such that it implements: means for obtaining information on the current geolocation of said gathering gateway; means for obtaining information representing a communication technology used for determining the current geolocation of said gathering gateway; means for obtaining information indicating whether the current geolocation of said gathering gateway was determined thanks to means internal to said gathering gateway, or whether the current geolocation of said gathering gateway was determined thanks to means external to said gathering gateway. In addition, said gathering gateway implements means for transmitting the information thus obtained in a beacon or a succession of beacons.

The invention also relates to a computer program, which can be stored on a medium and/or downloaded from a communication network, in order to be read by a processor. This computer program comprises instructions for implementing the method mentioned above, when said program is executed by the processor. The invention also relates to an information storage medium comprising such a computer program.

The features of the invention mentioned above, as well as others, will emerge more clearly from the reading of the following description of the example embodiment, said description being given in relation to the accompanying drawings, among which.

Figure 1:
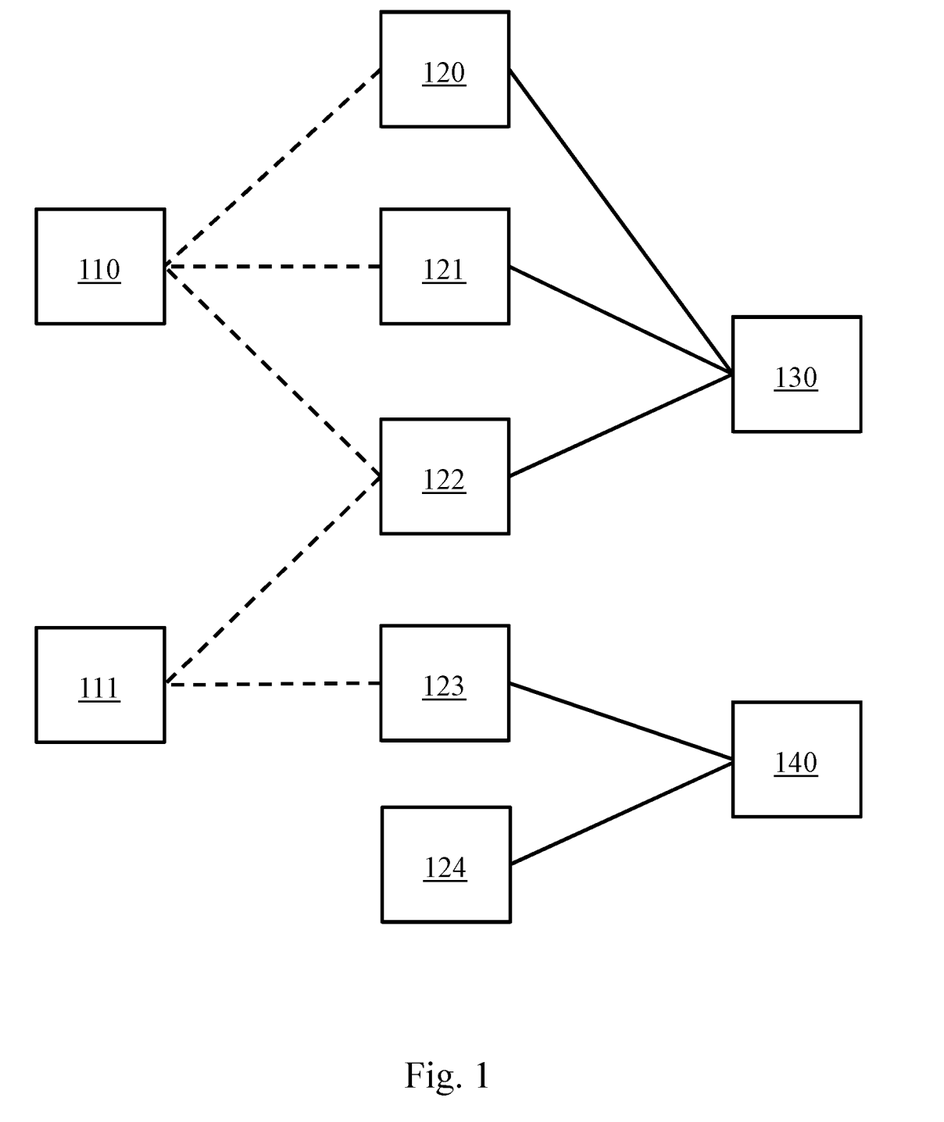
FIG. 1 illustrates schematically a communication system in which the present invention can be implemented.

The communication system comprises a plurality of gathering gateways 120, 121, 122. The gathering gateways 120, 121, 122 have respective communication links with a first server 130, to which said gathering gateways are attached. Other gathering gateways 123, 124 have respective communication links with a second server 140 to which said gathering gateways are attached, thus forming another communication system. Two independent network infrastructures are thus implemented, a first network infrastructure around the first server 130 and a second communication network infrastructure around the second server 140.

According to a particular embodiment, each gathering gateway 120, 121, 122, 123, 124 includes a function for access to the Internet, and the communication link between said residential gateway with the server to which said gateway is attached is based on the IP protocol (Internet Protocol, as defined in the normative document RFC 791).

In the communication system, messages shall be sent from each terminal device 110, 111 to the server of the network infrastructure to which said terminal device is attached. Said server has a role of monitoring and gathering information available from terminal devices 110, 111, and the gathering gateways 120, 121, 122, 123, 124 have a role of relay between the terminal devices 110, 111 and the servers of the network infrastructure to which said terminal devices are respectively attached. Optionally messages may also be transmitted from the servers to the terminal devices via the gathering gateways. An example of protocol architecture implemented in the communication system is described below in relation to FIG. 3.

To enable fulfilling this role of relay, each gathering gateway 120, 121, 122, 123, 124 has at least one radio interface enabling said gathering gateway to communicate with at least one terminal device 110, 111, namely at least one communicating object according to the Internet of Things terminology. Said radio interface is for example in accordance with the LoRaWAN protocol (registered trade mark), which is based on the LoRa (registered trade mark) radio communication technology. The radio interface is such that a terminal device may be within radio communication range of a plurality of gathering gateways. This is the case for example with the terminal device 110 in FIG. 1, which is within radio communication range of the gathering gateways 120, 121, 122. Said radio interface is such that a terminal device may be within radio communication range of a plurality of gathering gateways belonging to separate network infrastructures. This is the case for example with the terminal device 111 in FIG. 1, which is within radio communication range of the gathering gateways 122, 123, which belong to separate network infrastructures. Thus, in a particular embodiment where the terminal device in question is able to decode beacons transmitted by gathering gateways belonging to a network infrastructure separate from the network infrastructure to which said terminal device is attached, said terminal device may use said beacons as spatial references for performing geolocation of said terminal device and/or for determining a temporal reference for performing time and frequency synchronisation of said terminal device.

Such beacons are constructed as described below in relation to FIG. 4 and are used as described below in relation to FIG. 5.

Figure 2:
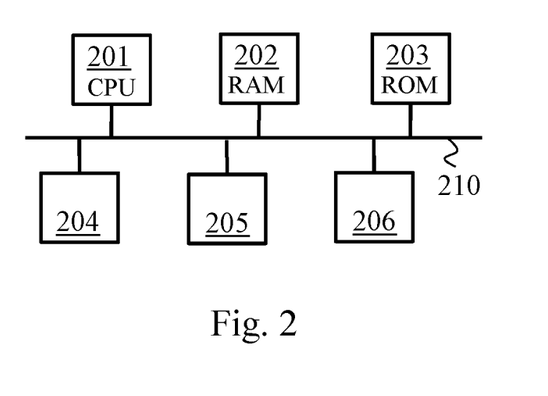
FIG. 2 illustrates schematically an example of hardware architecture of a communication device of the communication system of FIG. 1.

FIG. 2 illustrates schematically an example of hardware architecture of a communication device of the communication system of FIG. 1. Each terminal device and/or each gathering gateway and/or each server of the communication system can be constructed on the basis of such hardware architecture.

The communication device comprises, connected by a communication bus 210: a processor or CPU (central processing unit) 201; a random access memory (RAM) 202; a read-only memory (ROM) 203; a storage unit or a storage medium reader, such as an SD (secure digital) card reader 204 or a hard disk drive (HDD); a communication interface 205, and optionally another communication interface 206.

When the communication device of FIG. 2 represents a terminal device of the communication system, the communication interface 205 is configured to enable said terminal device to communicate with gathering gateways of the communication system.

When the communication device of FIG. 2 represents a gathering gateway of the communication system, the communication interface 205 is configured to enable said gathering gateway to communicate with terminal devices of the communication system, and the other communication interface 206 is configured to enable said gathering gateway to communicate with the server of the network infrastructure to which said gathering gateway is attached.

When the communication device of FIG. 2 represents a server of the communication system, the communication interface 205 is configured to enable said server to communicate with the gathering gateways of the communication system that are attached to the same network infrastructure as said server.

The processor 201 is capable of executing instructions loaded in the RAM 202 from the ROM 203, from an external memory, from a storage medium, or from a communication network. When the communication device is powered up, the processor 201 is capable of reading instructions from the RAM 202 and executing them. These instructions form a computer program causing implementation, by the processor 201, of all or some of the algorithms and steps described herein in relation to the communication device in question.

Thus all or some of the algorithms and steps described herein may be implemented in software form by the execution of a set of instructions by a programmable machine, such as a DSP (digital signal processor) or a microcontroller. All or some of the algorithms and steps described here may also be implemented in hardware form by a machine or a dedicated component, such as a FPGA (field-programmable gate array) or an ASIC (application-specific integrated circuit).

Figure 3:
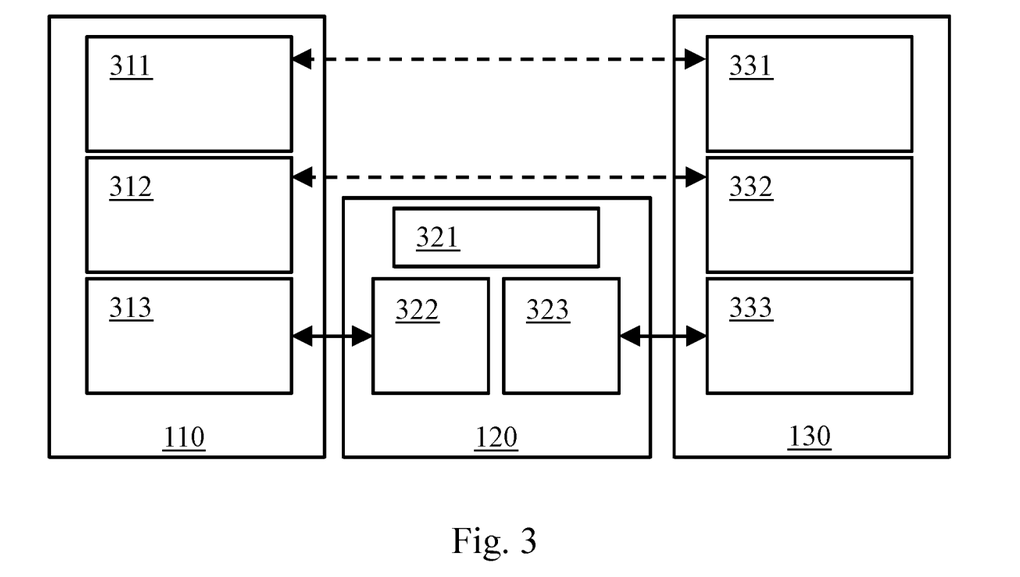
FIG. 3 illustrates schematically an example of protocol architecture implemented in the communication system of FIG. 1.

FIG. 3 illustrates schematically an example of protocol architecture implemented in the communication system. FIG. 3 illustrates the protocol architecture distributed between the terminal device 110, the gathering gateway 120 and the first server 130.

The terminal device 110 comprises a top layer 311 and a bottom layer 313, as well as an intermediate layer 312 forming the link between the top layer 311 and the bottom layer 313. The top layer 311 is a client application. The intermediate layer 312 implements the exchange protocol, for example of the LoRaWAN (registered trade mark) type, between the terminal device 110 and the first server 130. The bottom layer 313 is the physical layer (PHY) of the radio interface of the terminal device 110, for example of the LoRa (registered trade mark) type, which enables communicating with the gathering gateways of the communication system, such as for example the gathering gateway 120.

The first server 130 comprises a top layer 331 and a bottom layer 333, as well as an intermediate layer 332 forming the link between the top layer 331 and the bottom layer 333. The top layer 331 is a server application. The intermediate layer 332 implements the exchange protocol, for example of the LoRaWAN (registered trade mark) type, between the first server 130 and each terminal device attached to the network infrastructure to which said first server 130 belongs, such as for example the terminal device 110. The bottom layer 333 is the physical layer (PHY) of the interface of the first server 130, which enables communicating with the gathering gateways of the network infrastructure to which said first server 130 belongs, such as for example the gathering gateway 120.

The gathering gateway 120 comprises a first bottom layer 322 and a second bottom layer 323, as well as an adaptation module 321. The first bottom layer 322 is the physical layer (PHY) of the radio interface of the gathering gateway 120, which enables communicating with terminal devices of the communication system, such as for example the terminal device 110. The second bottom layer 323 is the physical layer (PHY) of the interface of the gathering gateway 120, which enables communicating with the first server 130. The adaptation module 321 is configured to convert the messages received via the first bottom layer 322 into messages suited to the second bottom layer 323, and vice-versa.

The protocol architecture shown in FIG. 3 is such that the intermediate layer 312 of the terminal device 110 communicates with the intermediate layer 332 of the first server 130, relying on the respective bottom layers of the terminal device 110 and of the first server 130 via the gathering gateway 120. The protocol architecture shown in FIG. 3 is also such that the top layer 311 of the terminal device 110 communicates with the top layer 331 of the first server 130, relying on the respective intermediate layers 312, 332 of the terminal device 110 and of the first server 130.

The protocol layers and modules shown may be supplemented in particular by protocol stacks enabling the first server 130 to exchange with the gathering gateway 120, in particular to enable the server 130 to configure the gathering gateway 120.

In the context of the protocol architecture shown in FIG. 1, the first bottom layer 321 of the gathering gateway 120 is responsible for regularly sending beacons, as described below in relation to FIG. 4, and the bottom layer 313 of the terminal device 110 is responsible for receiving and processing said beacons, as described below in relation to FIG. 5. Regularly sending beacons may also be managed by a supplementary module of the gathering gateway 120 which is connected to the bottom layer 322 independently of the adaptation module 321. Processing said beacons may also be managed by a supplementary module of the terminal device 110 which is connected to the bottom layer 313 independently of the intermediate layer 312. Receiving beacons issuing from other gathering gateways may also be managed by the first bottom layer 322 of the gathering gateway 120, and processing said beacons, as described below in relation of FIG. 5, may be managed either by said first bottom layer 322 or by a supplementary module of the gathering gateway 120 that is connected to the bottom layer 322 independently of the adaptation module 321.

Figure 4:
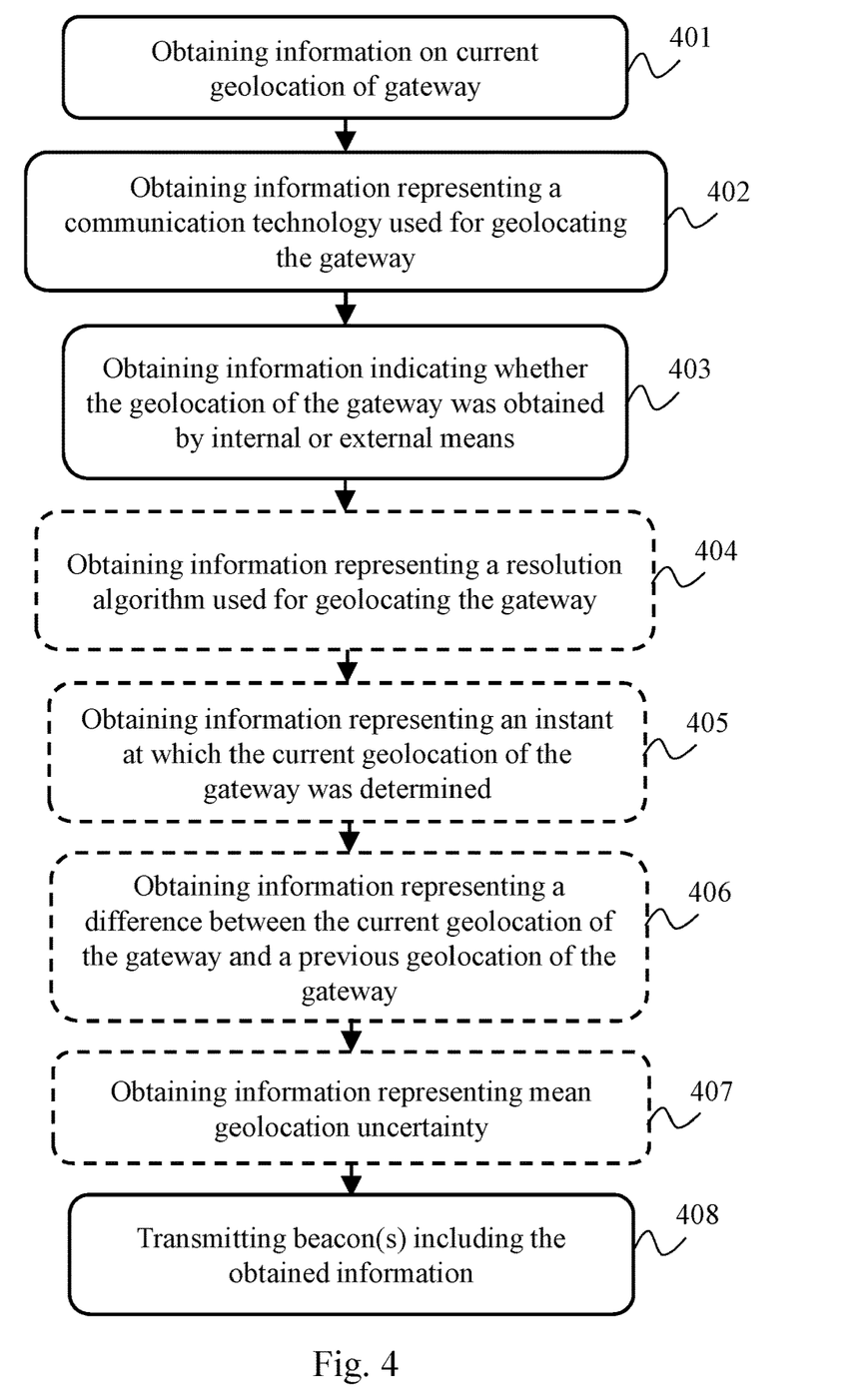
FIG. 4 illustrates schematically an algorithm for transmitting beacons in the communication system of FIG. 1.

FIG. 4 illustrates schematically an algorithm for transmitting beacons in the communication system. The algorithm in FIG. 4 is preferentially implemented by each gathering gateway in the communication system. Let us consider by way of illustration that the algorithm in FIG. 4 is implemented by the gathering gateway 120.

In a step 401, the gathering gateway 120 obtains current geolocation information on said gathering gateway 120, or at least, when the gathering gateway 120 has a remote antenna, information on current geolocation of said antenna. This current geolocation information can be obtained in various ways. Depending on the gathering gateway in question, different methods are probably used in the same communication system. The geolocation is, according to a first example, obtained thanks to a resolution algorithm of the TOA (time of arrival) type thanks to a GPS chip integrated in the gathering gateway 120, namely therefore means internal to the gathering gateway 120. The current geolocation information is, according to a second example in which the gathering gateway 120 is installed in a fixed immutable manner, obtained by parameterising the gathering gateway 120 when said gathering gateway 120 is installed thanks to a resolution algorithm of the TOA type via a GPS chip integrated in separate equipment used by an operator at the time of said installation, namely means external to the gathering gateway 120. The current geolocation information is, according to a third example, obtained thanks to a resolution algorithm of the TDOA or DRSS type by the gathering gateway 120 itself thanks to reception of signals coming from other gathering gateways (the respective geolocations of which are known), namely therefore means internal to the gathering gateway 120. The current geolocation information is, according to a fourth example, obtained thanks to a resolution algorithm of the TDOA or DRSS type by an external central unit connected to third-party gathering gateways (the respective geolocations of which are known) thanks to receptions of signals coming from the gathering gateway 120 by said third-party gathering gateways, namely therefore means external to the gathering gateway 120 (said external central unit then transmitting said current geolocation to said gathering gateway 120).

In a step 402, the gathering gateway 120 obtains information Loc_RAT representing a communication technology used for determining the current geolocation of the gathering gateway 120. In a preferred embodiment, this information Loc_RAT represents a communication technology used for determining the current geolocation of the gathering gateway 120. For example, the information Loc_RAT represents the fact that the current geolocation of the gathering gateway 120 was determined thanks to a GPS chip, or that the current geolocation of the gathering gateway 120 was determined thanks to the radio interface that enables said gathering gateway 120 to communicate with terminal devices in the communication system (and to receive signals from other gathering gateways).

In a step 403, the gathering gateway 120 obtains information Loc_Intern indicating whether the current geolocation of the gathering gateway was determined by means internal to said gathering gateway 120, for example an integrated GPS chip, or whether the current geolocation of the gathering gateway was determined by means external to said gathering gateway 120.

In an optional step 404, the gathering gateway 120 obtains information Loc_Meth representing a resolution algorithm used for determining the current geolocation of the gathering gateway 120. Such information is in particular not necessary when the resolution algorithm used is derived unambiguously from the communication technology used for determining the current geolocation of the gathering gateway 120. For example, if the communication technology used is based on the use of a GPS chip, it implies that the resolution algorithm used for determining the current geolocation of the gathering gateway 120 is of the TOA type.

In an optional step 405, the gathering gateway 120 obtains information Loc_PosT representing an instant at which the current geolocation of the gathering gateway 120 was determined.

In an optional step 406, the gathering gateway 120 obtains information Loc_LastPosDif representing any difference between the current geolocation of the gathering gateway 120 and a previous geolocation of the gathering gateway 120 (typically any difference between the two latest geolocations of the gathering gateway 120). One alternative consists of obtaining, instead, information representing said previous geolocation, but this would suppose a greater number of bits for representing the information obtained at the step 406. Having knowledge of the difference between the current geolocation and the previous geolocation enables equipment obtaining this information by beacon decoding (as described below in relation to FIG. 5) to have a rough estimate of the stability of the geolocation of the concerned gathering gateway, without having to observe and store the contents of various successive beacons, which, for LPWAN communication technologies, may sometimes take several minutes.

In an optional step 407, the gathering gateway 120 obtains information Loc_PosUncert representing a mean geolocation uncertainty vis-à-vis the gathering gateway 120.

In a step 408, the gathering gateway 120 constructs a beacon, to be sent to terminal devices in the communication system (even if this beacon may also be received by other gathering gateways), including the information obtained at the steps 401 to 407. The gathering gateway 120 then, at the opportune moment vis-à-vis the scheduling of the transmissions between gathering gateways and terminal devices, transmits the beacon thus constructed.

In a particular embodiment, the parameters Loc_LastPosDif and Loc_PosUncert are replaced for the construction of the beacon by a parameter Loc_Conv indicating convergence of the geographical coordinates of the concerned gathering gateway, in order to minimise the quantity of information to be transmitted via said beacon. The parameter Loc_Conv represents the absolute value of the difference between the value of the parameter Loc_LastPosDif and the value of the parameter Loc_PosUncert. The parameter Loc_Conv is preferentially defined according to the following rule:

when the absolute value of the parameter Loc_LastPosDif is less than or equal to the absolute value of the parameter Loc_PosUncert. the parameter Loc_Conv takes a first default value, e.g. the binary value "1", and when the absolute value of the parameter Loc_LastPosDif is higher than the absolute value of the parameter Loc_PosUncert, the parameter Loc_Conv takes a second default value distinct from the first default value, e.g. the binary value "0".

Thanks to the information thus contained in this beacon, the gathering gateway 120 supplies to other items of equipment, terminal devices and/or other gathering gateways, indications concerning the quality of the current geolocation information broadcast in said beacon, and thus enabling said other items of equipment to perform their own internal classification in order to consider or not said beacon (and therefore the gathering gateway that transmitted said beacon) to be a spatial reference in their own geolocation operations and/or to weight said beacon as a temporal reference in their own time and frequency synchronisation operations.

The algorithm in FIG. 4 is such that the information obtained in the steps 401 to 407 are inserted in each beacon sent by the gathering gateway 120. The information obtained in steps 401 to 407 may be distributed over a plurality of successive beacons. An alternation with beacons strictly in conformity with the LoRaWAN 1.0 specifications may be established, so as to maintain compatibility with equipment, terminal devices and/or gathering gateways already installed or available off the shelf.

It is possible to divide the same beacon field into a plurality of subfields, so as to optimise use of the bytes. It is also possible to use look-up tables to replace combinations of field values by table indexes.

Let us consider by way of illustration a communication system based on the LoRa (registered trade mark) communication technology as described in the LoRaWAN v1.0 specifications, each beacon transmitted by a gathering gateway including an identifier (a field called NetId) of the network infrastructure to which said gathering gateway belongs, and GPS timestamping information (a field called Time), as well as information specific to said gathering gateway (a field called GwSpecific). In the LoRaWAN v1.0 specifications, this field GwSpecific indicates the type of specific information contained (field InfoDesc), as well the geographical coordinates (latitude and longitude) of the relevant antenna of the gathering gateway in question. For the field InfoDesc, many possible values can be used, not yet defined by the LoRaWAN v.1.0 specifications (worded RFU "reserved for future use"). In the LoRaWAN v1.0 specifications, the field InfoDesc has a size of one byte: the values "0", "1" and "2" are reserved for the broadcast of coordinates (latitude, longitude) respectively of first, second and third antennas of the gathering gateway transmitting the beacon in question; the values "3" to "127" are intended for future uses, and therefore can be allocated to the transmission of information obtained in the steps 401 to 407; and the values "128" to "255" are reserved for broadcasts specific to the network infrastructure.

In a first example of adaptation of the field InfoDesc:
the value "3" is allocated to the transmission, in the field GwSpecific, of the parameters Loc_Intern, Loc_RAT, Loc_Meth and Loc_PosT;
the value "4" is allocated to the transmission, in the field GwSpecific, of altitude coordinates, for supplementing the geographical latitude and longitude coordinates;
the value "5" is allocated to the transmission, in the field GwSpecific, of horizontal uncertainty information;
the value "6" is allocated to the transmission, in the field GwSpecific, of vertical uncertainty information, the parameter Loc_PosUncert thus being distributed over two separate beacons;
the value "7" is allocated to the transmission, in the field GwSpecific, of information on the difference between the latitude and longitude coordinates (transmitted with a field InfoDesc of value "0", "1" or "2") and the very last longitude and latitude coordinates previously broadcast; and
the value "8" is allocated to the transmission, in the field GwSpecific, of information on the difference in altitude (transmitted with a field InfoDesc of value "4") with the very last altitude coordinates previously broadcast, the parameter Loc_LastPosDif thus being distributed over two separate beacons.

Since the broadcast values provide information on a given antenna among the possible antennas of the gathering gateway in question, it is considered that these broadcast values then relate to the last broadcast antenna number (depending on the actual value of the last field InfoDesc of value "0", "1" or "2" broadcast).

In a second example of adaptation of the field InfoDesc:
the value "3" is allocated to the transmission, in the field GwSpecific, of the parameters Loc_Intern, Loc_RAT, Loc_Meth and Loc_PosT;
the value "4" is allocated to the transmission, in the field GwSpecific, of altitude coordinates, for supplementing the geographical latitude and longitude coordinates, as well as to the parameter Loc_PosUncert in the form of horizontal uncertainty information and vertical uncertainty information; and
the value "5" is allocated to the transmission, in the field GwSpecific, of the parameter Loc_LastPosDif in the form of information on the difference between the latitude and longitude coordinates (transmitted with a field InfoDesc of value "0", "1" or "2") and the very last latitude and longitude coordinates previously broadcast and information on the difference between altitude (transmitted with a field InfoDesc of values "4") and the very last altitude coordinates previously broadcast.

The first and second example embodiments above are intended to preserve a size of field GwSpecific equal to seven bytes (and therefore one byte is reserved for the field InfoDesc), and therefore a plurality of successive supplementary beacon transmissions are necessary in order to convey the information obtained in the steps 401 to 407. Since beacon transmissions are not very frequent (according to the LoRaWAN (registered trade mark) protocol a period of one hundred and twenty-eight seconds elapses between two successive beacon transmissions), it is advantageous to be able to use beacons of variable size.

Thus, in a third example of adaptation of the field InfoDesc:
the value "3" is allocated to the transmission, in the field GwSpecific, of the parameters Loc_Intern, Loc_RAT, Loc_Meth and Loc_PosT;
the value "4" is allocated to the transmission, in the field GwSpecific, of altitude coordinates, for supplementing the geographical latitude and longitude coordinates, as well as to the parameter Loc_PosUncert in the form of horizontal uncertainty information and vertical uncertainty information; and
the value "5" is allocated to the transmission, in the field GwSpecific, of the parameter Loc_LastPosDif in the form of information on the difference between the latitude and longitude coordinates (transmitted with a field InfoDesc of value "0", "1" or "2") and the very last latitude and longitude coordinates previously broadcast and information on the difference between altitude (transmitted with a field InfoDesc of values "4") and the very last altitude coordinates previously broadcast; and
the value "127" is allocated to a field GwSpecific of parameterisable size, the field GwSpecific then beginning with a subfield of predefined size and with a value representing the actual size of said field GwSpecific, the content of the remainder of said field GwSpecific being arranged in accordance with predefined rules according to the actual size of said field GwSpecific.

In a fourth example of adaptation of the field InfoDesc:
the value "0" is reallocated to the broadcasting of coordinates (latitude, longitude) of the first antenna of the gathering gateway transmitting the beacon in question, said coordinates being obtained thanks to a GPS chip internal to said gathering gateway;
the value "1" is reallocated to the broadcasting of coordinates (latitude, longitude) of the second antenna of the gathering gateway transmitting the beacon in question, said coordinates being obtained thanks to a GPS chip internal to said gathering gateway;
the value "2" is reallocated to the broadcasting of coordinates (latitude, longitude) of the third antenna of the gathering gateway transmitting the beacon in question, said coordinates being obtained thanks to a GPS chip internal to said gathering gateway;
the value "3" is allocated to the broadcasting of coordinates (latitude, longitude) of the first antenna of the gathering gateway transmitting the beacon in question, said coordinates being obtained thanks to a GPS chip external to said gathering gateway;
the value "4" is allocated to the broadcasting of coordinates (latitude, longitude) of the first antenna of the gathering gateway transmitting the beacon in question, said coordinates being obtained, internally to said gathering gateway, otherwise than thanks to a GPS chip; and
the value "5" is allocated to the broadcasting of coordinates (latitude, longitude) of the first antenna of the gathering gateway transmitting the beacon in question, said coordinates being obtained, externally to said gathering gateway, otherwise than thanks to a GPS chip.

This fourth example of adaptation of the field InfoDesc can be supplemented by allocating other values to the broadcasting of coordinates (latitude, longitude) of the second antenna and third antenna of the gathering gateway transmitting the beacon in question, stating by what means said coordinates were obtained.

This fourth example of adaptation of the field InfoDesc can also be modified by omitting the allocation of the value "5" and allocating the value "4" to the transmission of coordinates (latitude, longitude) of the first antenna of the gathering gateway transmitting the beacon in question, said coordinates being obtained otherwise than thanks to a GPS chip (being of little importance whether it be internal or external to said gathering gateway).

It should be noted that, in the communication systems in which the beacons are transmitted without encryption, the beacons thus transmitted by the gathering gateways of said communication systems can be decoded by equipment, terminal devices and/or gathering gateways, of another co-located communication system. This other co-located communication system can then serve as an item of equipment which is not attached thereto but which uses the same LPWAN communication technology, to define a temporal reference and/or at least one spatial reference.

Figure 5:
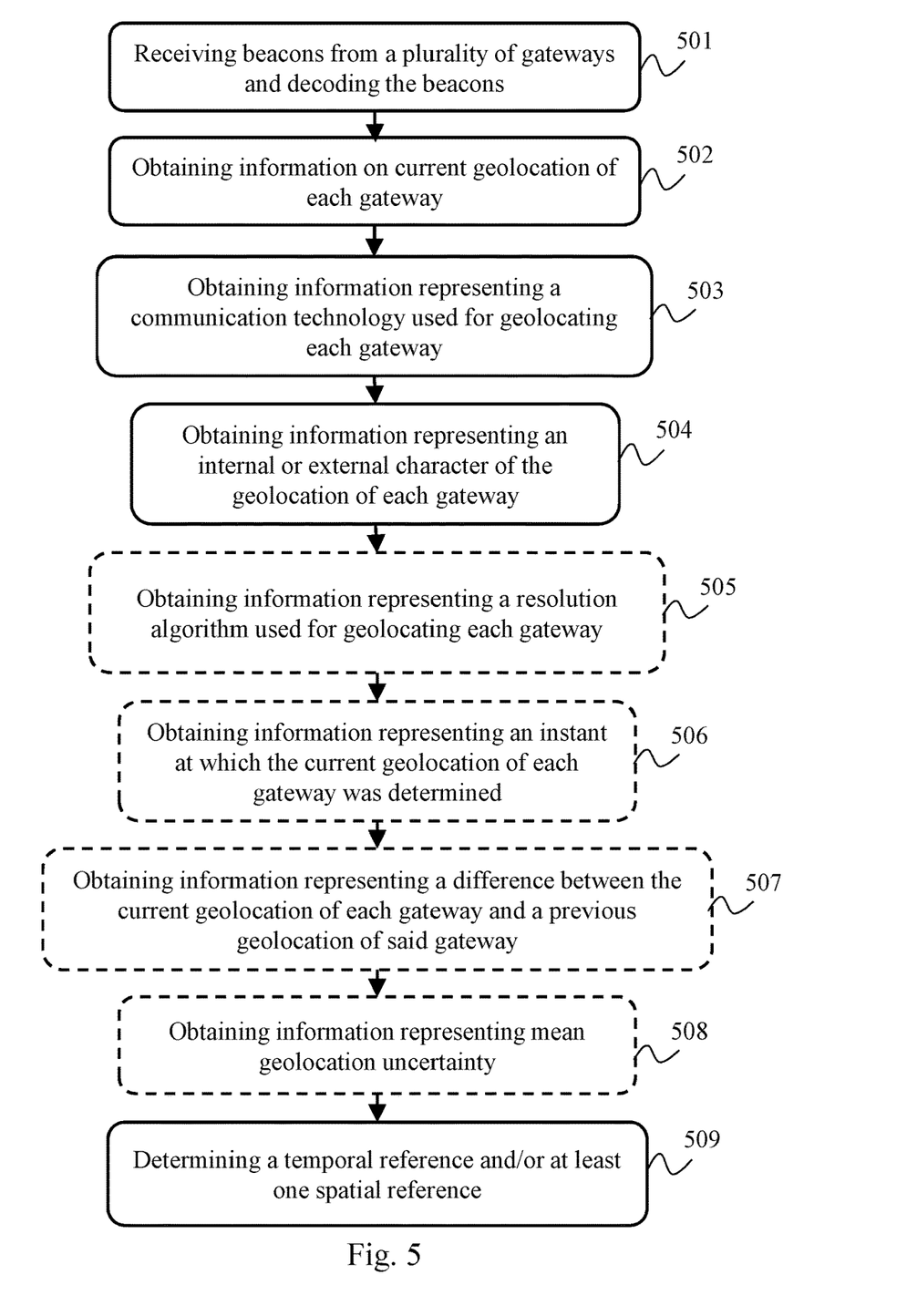
FIG. 5 illustrates schematically an algorithm for receiving and processing beacons in the communication system of FIG. 1.

FIG. 5 illustrates schematically an algorithm for receiving and processing beacons in the communication system. The algorithm in FIG. 5 is implemented by equipment wishing to obtain a temporal reference and/or at least one spatial reference, in order to perform respectively time and frequency synchronisation and/or geolocation operations. This may be a terminal device or a gathering gateway seeking to determine its own geolocation. This may be a terminal device or a gathering gateway seeking to perform time and frequency synchronisation vis-à-vis the communication system. Let us consider by way of illustration that the algorithm in FIG. 5 is implemented by the terminal device 110.

In a step 501, the terminal device 110 receives a beacon from a gathering gateway. The beacon in question may have been transmitted by a gathering gateway attached to a communication system other than the one to which said terminal device 110 is itself attached. The beacon received at the step 501 was sent in accordance with the algorithm described above in relation to FIG. 4.

In a step 502, the terminal device 110 parses the beacon received at the step 501 and obtains therefrom information on current geolocation of the gathering gateway that transmitted the beacon received at the step 501 or at least, when said gathering gateway has a remote antenna, information on the current geolocation of said antenna.

In a step 503, the terminal device 110 parses the beacon received at the step 501 and obtains therefrom the information Loc_RAT representing the communication technology used for determining the current geolocation of the gathering gateway that transmitted the beacon received at the step 501.

In a step 504, the terminal device 110 parses the beacon received at the step 501 and obtains therefrom the information Loc_Intern indicating whether the current geolocation of the gathering gateway that transmitted the beacon received at the step 501 was determined by means internal to said gathering gateway, or whether the current geolocation of the gathering gateway that transmitted the beacon received at the step 501 was determined by means external to said gathering gateway.

In an optional step 505, the terminal device 110 parses the beacon received at the step 501 and obtains therefrom the information Loc_Meth representing the resolution algorithm used for determining the current geolocation of the gathering gateway that transmitted the beacon received at the step 501.

In an optional step 506, the terminal device 110 parses the beacon received at the step 501 and obtains therefrom the information Loc_PosT representing the instant at which the current geolocation of the gathering gateway that transmitted the beacon received at the step 501 was determined.

In an optional step 507, the terminal device 110 parses the beacon received at the step 501 and obtains therefrom the information Loc_LastPosDif representing any difference between the current geolocation of the gathering gateway that transmitted the beacon received at the step 501 and a previous geolocation of said gathering gateway. This enables the terminal device 110 to have a rough estimate of the stability of the geolocation of the gathering gateway that transmitted the beacon received at the step 501, without having to observe and store the contents of various successive beacons. Instead, the terminal device 110 may obtain information representing said previous geolocation.

In an optional step 508, the gathering gateway 120 parses the beacon received at the step 501 and obtains therefrom information Loc_PosUncert representing a mean uncertainty on geolocation vis-à-vis the gathering gateway that transmitted the beacon received at the step 501.

In a variant embodiment, the steps 507 and 508 are replaced by a step where the terminal device 110 parses the beacon received at the step 501 and obtains therefrom the parameter Loc_Conv indicating convergence of the geographical coordinates of the gathering gateway that transmitted the beacon received at the step 501.

The algorithm in FIG. 5 is such that the information obtained in the steps 502 to 508 is inserted in the same beacon. The information obtained in the steps 502 to 508 may however be distributed over a plurality of successive beacons, optionally with an alternation with beacons strictly in accordance with the LoRaWAN 1.0 specifications.

In a step 509, the terminal device 110 uses the information obtained in the steps 502 to 508 for defining a temporal reference and/or at least one spatial reference. Particular embodiments are described below in relation to FIGS. 6 and 7.

The terminal device 100 can determine its own position by conventional geolocation methods of the DRSS or TDOA type on the basis of the use of reference signals, such as the aforementioned beacons. To do this, the terminal device 110 needs to know the geographical positions of the items of equipment that transmitted these reference signals. By using the information obtained in the steps 502 to 508, the terminal device 110 selects the beacons to be considered for defining spatial references enabling to obtain its own geolocation. At least one of these spatial references may be obtained by using the information obtained in the steps 502 to 508, while others may be predefined. If the computing capacities of the terminal device 110 are limited, having a set of beacons to be processed that is small but reliable is advantageous, the geolocation methods generally involving matrix inversion operations that are expensive in terms of computing and that may be unstable.

More specifically, the parameters Loc_RAT and Loc_Meth enable the terminal device 110 to classify the beacons received from various gathering gateways, preferring for example the beacons transmitted by gathering gateways the position of which is obtained by dedicated communication technologies (of the GPS type).

The beacons having respective identical values of the parameter Loc_RAT, the parameter Loc_PosT allows classifying the beacons by giving preference to the most recent ones.

The parameter Loc_Intern may be used in combination with the parameter Loc_RAT and optionally the parameter Loc_Meth, to enable the terminal device 110 to refine the classification of the received beacons, according to the value of the parameter Loc_RAT. For example, for a communication technology for geolocation of the GPS type, it may be more advantageous to privilege the fact that the geographical coordinates included in the beacon were obtained internally, while, for a communication technology of the LoRaWAN (registered trade mark) type with a resolution algorithm of the DRSS or TDOA type, it may be more advantageous to privilege the fact that the geographical coordinates included in the beacon were obtained externally, since they may allow envisaging greater accuracy (computing power for example), compared with the values of the parameter Loc_PosUncert.

The parameter Loc_LastPosDif, indirectly coupled to the parameter Loc_PosT, enables assessing dispersion or convergence of the used geolocation method with respect to the uncertainties broadcast in the parameter Loc_PosUncert. Thus, if the difference in geolocation broadcast via the parameter Loc_LastPosDif is greater than the uncertainties broadcast in the parameter Loc_PosUncert of the geolocation method broadcast via the parameters Loc_RAT and Loc_Meth, the terminal device 110 may consider that the location method of the gathering gateway that transmitted the beacon in question has not yet converged and consequently not consider it for defining the spatial references.

The information transmitted in such beacons thus enables the terminal device 110 to better assess whether or not it must consider the geographical positions respectively broadcast in said beacons for defining the spatial references necessary for its own geolocation. The terminal device 110 can thus more easily and effectively construct a list of candidate beacons, as described below in relation to FIG. 6.

The terminal device 110, seeking a time and frequency synchronisation source vis-à-vis the synchronisation system, may also use the information transmitted in such beacons, using in particular parameters Loc_RAT, Loc_Meth and Loc_Intern. Indeed, if a beacon in question indicates that the geographical position broadcast was obtained thanks to a GPS chip integrated in the gathering gateway that transmitted said beacon, the terminal device 110 may then consider that said gathering gateway then has capacities, hardware and optionally software, enabling it to use the GPS signal for its own geolocation and also to synchronise itself in time and frequency vis-à-vis the communication system. The terminal device 110 may then consider, or favourably weight, the beacon in question in the definition of a temporal reference for synchronising itself in time and frequency and thus correcting an internal clock in case of drift. A beacon indicating that the geographical position broadcast was obtained thanks to an external GPS chip may not be considered, or may be weighted unfavourably, for the time and frequency synchronisation of the terminal device 110 (absence of direct time and frequency synchronisation source), the gathering gateway thus being potentially controlled by unknown reliability mechanisms.

The terminal device 110 may thus weight the received beacons for defining a temporal reference for the time and frequency synchronisation of the terminal device 110, favouring the beacons the broadcast geographical position of which was obtained thanks to a GPS chip integrated in the gathering gateway that transmitted said beacon, since this supposes that the gathering gateway has an accurate synchronisation source. Having such a time and frequency synchronisation source, the gathering gateway in question can be considered to be generating beacons that can be used for defining a temporal reference in a time and frequency synchronisation process, e.g. by "sniffing", as described below in relation to FIG. 7.

It should be noted that other rules, based on the aforementioned parameters broadcast in the beacons of the communication system, may be implemented for considering or not, or weighting, said beacons in the geolocation of the terminal device 110 and/or the time and frequency synchronisation of said terminal device 110 vis-à-vis the communication system.

Figure 6:
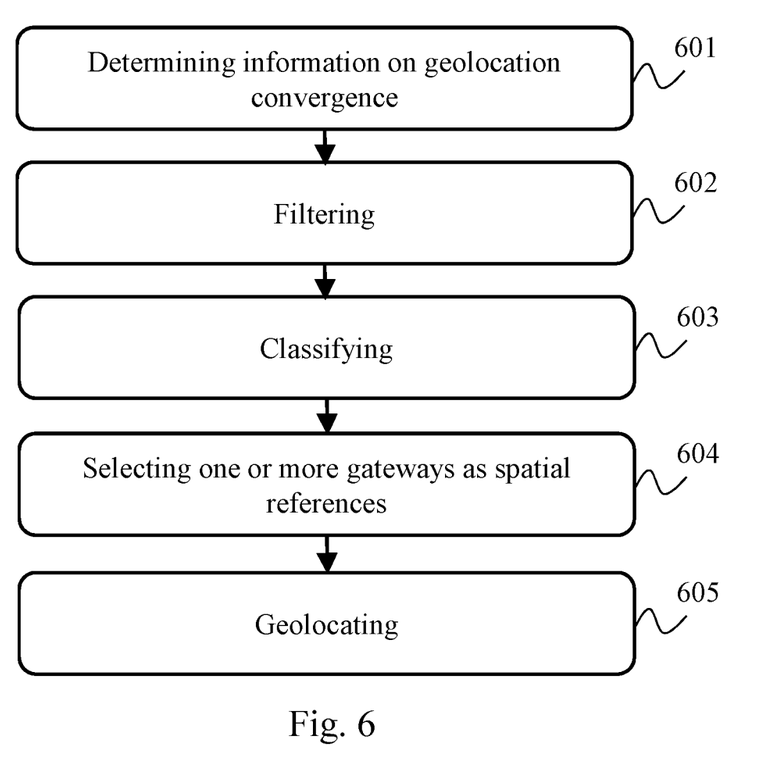
FIG. 6 illustrates schematically an algorithm for processing beacons in the communication system of FIG. 1, in a first particular embodiment.

FIG. 6 illustrates schematically an algorithm for processing beacons in the communication system, in a first particular embodiment of the definition of spatial references, in order to perform geolocation operations. The algorithm in FIG. 6 may be executed by a terminal device or a gathering gateway seeking to determine its own geolocation. Let us consider by way of illustration that the algorithm in FIG. 6 is implemented by the terminal device 110.

In a step 601, for each beacon processed in the context of the algorithm in FIG. 5 (or a plurality of successive beacons if the aforementioned parameters are broadcast via a succession of beacons), the terminal device 110 determines information on convergence of the geolocation broadcast in said beacon in question. The candidate beacons as spatial references for the operations of geolocation of said terminal device 110 may be the beacons where the parameter Loc_LastPosDif in absolute value is lower than or equal to the parameter Loc_PosUncert in absolute value. The same result is obtained via the parameter Loc_Conv.

Thus, in an optional step 602, the terminal device 110 performs a filtering of the received beacons according to the convergence information determined for each said beacon at the step 601.

In a step 603, the terminal device 110 performs a classification of the remaining beacons, after any filtering, in a list according to a set of predefined rules, for example in the following order of priority:
- according to the content of the parameters Loc_RAT, Loc_Meth, and favouring the beacons broadcasting geographical coordinates determined thanks to a GPS chip;
- then according to the content of the parameter Loc_LastPosDif, favouring the beacons broadcasting the most stable geographical coordinates;
- then according to the content of the parameter Loc_PosT, favouring the beacons broadcasting the most recent geographical coordinates;
- then according to the content of the parameter Loc_Intern, favouring the beacons broadcasting geographical coordinates determined internally.

In a step 604, the terminal device 110 relies on the sorted list obtained at the step 603 to select at least one received beacon as a spatial reference. The terminal device 110 retains a predetermined quantity N (e.g. N=5) of beacons at the top of the list as spatial references in order next to obtain its own geolocation. The predetermined quantity N enables reaching a trade-off between efficiency and accuracy. At least three spatial references are necessary to enable the terminal device 110 to obtain its own location. At least one of these spatial references may be selected from the beacons thus received, the other spatial references then being predefined or known to the terminal device 110 by another way.

In a step 605, the terminal device 110 determines its own geolocation, relying on the selection made at the step 604, for example using techniques of the DRSS or TDOA type.

Figure 7:
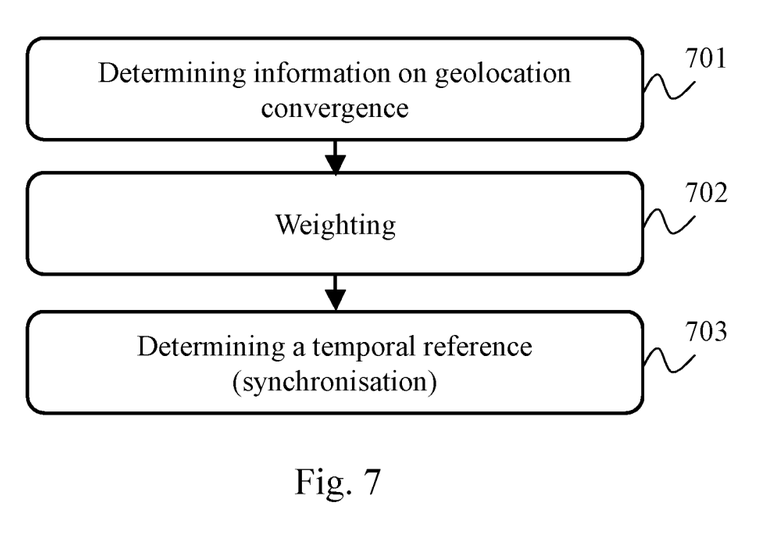
FIG. 7 illustrates schematically an algorithm for processing beacons in the communication system of FIG. 1, in a second particular embodiment.

FIG. 7 illustrates schematically an algorithm for processing beacons in the communication system, in a second particular embodiment of definition of a temporal reference, for performing time and frequency synchronisation operations. The algorithm in FIG. 7 may be executed by a terminal device or a gathering gateway seeking to synchronise in time and frequency vis-à-vis the communication system. Let us consider by way of illustration that the algorithm in FIG. 7 is implemented by the terminal device 110.

In a step 701, for each beacon processed in the context of the algorithm in FIG. 5 (or a plurality of successive beacons if the aforementioned parameters are broadcast via a succession of beacons), the terminal device 110 determines information on convergence of the geolocation broadcast in said beacon in question. The candidate beacons as a temporal reference for the time and frequency synchronisation operations of said terminal device 110 may be the beacons, the parameter Loc_LastPosDif of which in absolute value is less than or equal to the parameter Loc_PosUncert in absolute value. The same result is obtained via the parameter Loc_Conv.

In a step 702, for each beacon processed in the context of the algorithm in FIG. 5 (or a plurality of successive algorithms if the aforementioned parameters are broadcast via a succession of beacons), the terminal device 110 applies at least one weighting factor.

Let us consider by way of illustration that the parameter Loc_Intern takes the value "1" when the geolocation of the gathering gateway in question has been obtained internally to said gathering gateway, and that the parameter Loc_Intern takes the value "0" when the geolocation of the gathering gateway in question was obtained externally to said gathering gateway. Each beacon transmitted by a gathering gateway the geographical coordinates of which were obtained thanks to a GPS chip is then weighted by the following weighting factor:

$$\alpha_m (1-\alpha_i \cdot \text{Loc\_Intern} + 2 \alpha_i \cdot \text{Loc\_Intern})(1-\alpha_c \cdot \text{Loc\_Conv} + 2 \alpha_c \cdot \text{Loc\_Conv})$$

each other beacon is then weighted by the following weighting factor:

$$\beta_m (1-\beta_i \cdot \text{Loc\_Intern} + 2 \beta_i \cdot \text{Loc\_Intern})(1-\beta_c \cdot \text{Loc\_Conv} + 2 \beta_c \cdot \text{Loc\_Conv})$$

where $\alpha_m$, $\alpha_i$, $\alpha_c$, $\beta_m$, $\beta_i$ and $\beta_c$ are weighting coefficients.

It should be noted that, if the parameter Loc_Conv is not transmitted, this parameter Loc_Conv may be calculated by the terminal device from the parameters Loc_LastPosDif and Loc_PosUncert contained in the beacon in question.

It should be noted that, in the above formulations of the weighting factors:
- $\alpha_m > \beta_m$, which allows favouring the beacons broadcasting geographical coordinates obtained thanks to a GPS chip;
- $\alpha_i > 0.5$ and $\beta_i > 0.5$ allows favouring the beacons broadcasting geographical coordinates obtained internally to the gathering gateway in question;
- $\alpha_c > 0.5$ and $\beta_c > 0.5$ allows favouring the broadcasting beacons the geographical coordinates of which are considered to be stable.

In a step 703, the terminal device 110 determines a temporal reference for synchronising in time and frequency (compensating for any clock drifts) vis-à-vis the communication system, from the weighted beacons. If the scheduling of the beacons transmitted by a first gathering gateway shows a synchronisation frequency $f_1$ and that a factor $\alpha_1$ is allocated to the beacons transmitted by said first gathering gateway, and if the scheduling of the beacons transmitted by a second gathering gateway shows a synchronisation frequency $f_2$ and that a factor $\alpha_2$ is allocated to the beacons transmitted by said second gathering gateway, then the terminal device 110 uses as time reference a synchronisation frequency $f$ that is the weighted mean of the synchronisation frequencies $f_1$ and $f_2$, and therefore such that:

$$f = \frac{\alpha_1 \cdot f_1 + \alpha_2 \cdot f_2}{\alpha_1 + \alpha_2}$$

In the same way, if the scheduling of the beacons transmitted by a first gathering gateway shows a next instant $t_1$ of transmission of beacons in the communication system and that the factor $\alpha_1$ is allocated to the beacons transmitted by said first gathering gateway, and if the scheduling of the beacons transmitted by second gathering gateway shows a next instant $t_2$ of transmission of beacons in the communication system and that a factor $\alpha_2$ is allocated to the beacons transmitted by said second gathering gateway, then the terminal device 110 uses as time reference a next instant $t$ of transmission of beacons in the communication system that is the weighted mean of the instants $t_1$ and $t_2$, and therefore such that:

$$t = \frac{\alpha_1 \cdot t_1 + \alpha_2 \cdot t_2}{\alpha_1 + \alpha_2}$$

An alternative to the algorithm in FIG. 7 is selecting as time reference the beacon that is at the top of the list in a classification of received beacons, optionally after filtering, according to the same principle as described above in relation to FIG. 6 but applying different sorting rules.

It should also be noted that, since the LPWAN communication technology has a long range by definition, equipment suited to said LPWAN communication technology potentially captures a plurality of beacons transmitted by gathering gateways of different communication systems at different instants. Although transmitted at the same moment within the same communication system in principle, such equipment can potentially decode each of these beacons using advanced reception strategies (e.g. iterative receiver with successive interference cancellation).

The invention claimed is:

1. A method for determining a temporal reference and at least one spatial reference, by a device in a communication system comprising a plurality of gathering gateways adapted for communicating with wireless communication terminal devices, each of the gathering gateways being configured to transmit synchronization beacons in the communication system so as to enable devices receiving the synchronization beacons to synchronize in time and frequency vis-à-vis said communication system, wherein the method is implemented by said device, and for each beacon in a plurality of beacons or for each succession of beacons in a plurality of successions of beacons respectively received from separate gathering gateways, the method comprises:

parsing said beacon or said succession of beacons and obtaining therefrom first information on current geolocation of the gathering gateway that transmitted said beacon or said succession of beacons;

parsing said beacon or said succession of beacons and obtaining therefrom second information indicating what communication technology was used for determining the current geolocation of the gathering gateway that transmitted said beacon or said succession of beacons;

parsing said beacon or said succession of beacons and obtaining therefrom third information indicating whether the current geolocation of the gathering gateway that transmitted said beacon or said succession of beacons was determined internally in said gathering gateway, or whether the current geolocation of the gathering gateway that transmitted said beacon or said succession of beacons was determined externally to said gathering gateway;

classifying said beacon or said succession of beacons responsive to the first, second and third information;

determining, responsive to said classification, whether to consider or not said beacon or said succession of beacons in order to determine the temporal reference for synchronizing in time and frequency said device vis-à-vis said communication system and determining, responsive to said classification, how to weight said beacon or said succession of beacons to determine the temporal reference for synchronizing in time and frequency said device vis-à-vis said communication system; and determining, responsive to said classification whether to consider or not said beacon or said succession of beacons in order to determine the spatial reference or references for determining the geolocation of said device and determining, responsive to said classification, how to weight said beacon or said succession of beacons to determine the spatial reference or references for determining the geolocation of said device; and based on said determinations, determining the temporal reference for synchronizing in time and frequency said device vis-à-vis said communication system and the spatial reference or references for determining the geolocation of said device.

2. The method according to claim 1, wherein, for each beacon or each succession of beacons in said plurality of beacons, the method further comprises:

parsing said beacon or said succession of beacons and obtaining therefrom fourth information representing a resolution algorithm for determining the current geolocation of the gathering gateway that transmitted said beacon or said succession of beacons; and using said fourth information for classifying said beacon or said succession of beacons.

3. The method according to claim 1, wherein, for each beacon or each succession of beacons in said plurality of beacons, the method further comprises:

parsing said beacon or said succession of beacons and obtaining therefrom fifth information representing an instant at which the current geolocation of the gathering gateway that transmitted said beacon or said succession of beacons was determined; and using said fifth information for classifying said beacon or said succession of beacons.

4. The method according to claim 1, wherein, for each beacon or each succession of beacons in said plurality of beacons, the method further comprises:

parsing said beacon or said succession of beacons and obtaining therefrom sixth information representing any difference between the current geolocation of the gathering gateway that transmitted said beacon or said succession of beacons and a previous geolocation of said gathering gateway; and using said sixth information for classifying said beacon or said succession of beacons.

5. The method according to claim 1, wherein, for each beacon or each succession of beacons in said plurality of beacons, the method further comprises:

parsing said beacon or said succession of beacons and obtaining therefrom seventh information representing a mean uncertainty in geolocation vis-à-vis the gathering gateway that transmitted said beacon or said succession of beacons; and using said seventh information for classifying said beacon or said succession of beacons.

6. The method according to claim 1, wherein, for each beacon or each succession of beacons in said plurality of beacons, the method further comprises:

parsing said beacon or said succession of beacons and obtaining therefrom an indicator of convergence of geographical coordinates of the gathering gateway that transmitted said beacon or said succession of beacons; and using said indicator for classifying said beacon or said succession of beacons.

7. The method according to claim 1, wherein the method further comprises determining convergence information on convergence of the geolocation broadcast in said beacon or said succession of beacons in question and performing a filtering of the beacons according to the determined convergence information.

8. The method according to claim 1, wherein classifying comprises performing a classification of the beacons in a list according to a set of predefined rules, and retaining a predetermined quantity N of beacons or succession of beacons at the top of the list in order to determine the temporal reference for synchronizing in time and frequency said device vis-à-vis said communication system and the spatial reference or references for determining the geolocation of said device.

9. The method according to claim 1, wherein the method further comprises applying a weighting factor to each retained beacon or succession of beacons for determining the temporal reference for synchronizing in time and frequency said device vis-à-vis said communication system.

10. The method according to claim 9, wherein each beacon received from a gathering gateway, the current geolocation of which was obtained from a Global Positioning System chip, is weighted by the following weighting factor:

$$\alpha_m(1-\alpha_i\text{-Loc\_Intern}+2.\alpha_i.\text{Loc\_Intern})(1-\alpha_c\text{-Loc\_Conv}+2.\alpha_c.\text{Loc\_Conv})$$

and each other beacon is weighted by the following weighting factor:

$$\beta_m(1-\beta_i\text{-Loc\_Intern}+2.\beta_i.\text{Loc\_Intern})(1-\beta_c\text{-Loc\_Conv}+2.\beta_c.\text{Loc\_Conv})$$

where $\alpha_m$, $\alpha_i$, $\alpha_c$, $\beta_m$, $\beta_i$ and $\beta_c$ are weighting coefficients such that:

$\alpha_m > \beta_m$;
$\alpha_i > 0.5$ and $\beta_i > 0.5$;
$\alpha_c > 0.5$ and $\beta_c > 0.5$;

where Loc_Intern is equal to 1 when said current geolocation has been determined internally in said gathering gateway and is equal to 0 when said current geolocation was determined externally to said gathering gateway, and where Loc_Conv is used as an indicator of convergence of geographical coordinates of the gathering gateway that transmitted said beacon or said succession of beacons, Loc_Conv being equal to 1 when the difference in absolute value between the current geolocation of said gathering gateway and a previous geolocation of said gathering gateway is less than or equal to a mean uncertainty as to geolocation vis-à-vis the gathering gateway, and is equal to 0 otherwise.

11. A method for enabling a device to determine a temporal reference and at least one spatial reference, via a gathering gateway of a communication system comprising a plurality of such gathering gateways adapted for communicating with terminal devices by wireless communications, each of the gathering gateways transmitting synchronization beacons in the communication system so as to enable devices receiving the synchronization beacons to synchronize in time and frequency vis-à-vis said communication system, wherein the method is implemented by said gathering gateway and comprises:
obtaining first information on current geolocation of said gathering gateway;
obtaining second information indicating what communication technology was used for determining the current geolocation of said gathering gateway;
obtaining third information indicating whether the current geolocation of the gathering gateway was determined internally in said gathering gateway, or whether the current geolocation of said gathering gateway was determined externally to said gathering gateway; and
transmitting the first, second and third information in a beacon or in a succession of beacons, so as to enable said device to use said information for determining the temporal reference for synchronizing in time and frequency vis-à-vis said communication system and the spatial reference or references for determining the geolocation of said device and in that the device is configured to implement the method of claim 1.

12. Non-transitory information storage medium storing a computer program comprising a set of instructions causing execution, by a processor of a device configured to be included in a communication system, of the method according to claim 1, when said computer program is executed by said processor.

13. A device configured to determine a temporal reference and at least one spatial reference, the device configured to be included in a communication system further comprising a plurality of gathering gateways adapted for communicating with terminal devices by wireless communications, each of the gathering gateways being configured to transmit synchronization beacons in the communication system so as to enable devices receiving the synchronization beacons to synchronize in time and frequency vis-à-vis said communication system, wherein, for each beacon in a plurality of beacons or for each succession of beacons in a plurality of successions of beacons respectively received from distinct gathering gateways, said device implements in software form by execution of a set of instructions by a programmable machine or in hardware form by a machine or a dedicated component:
parsing said beacon or said succession of beacons and obtaining therefrom first information on current geolocation of the gathering gateway that transmitted said beacon or said succession of beacons;
parsing said beacon or said succession of beacons and obtaining therefrom second information indicating what communication technology was used for determining the current geolocation of the gathering gateway that transmitted said beacon or said succession of beacons;
parsing said beacon or said succession of beacons and obtaining therefrom third information indicating whether the current geolocation of the gathering gateway that transmitted said beacon or said succession of beacons has been determined internally in said gathering gateway, or whether the current geolocation of the gathering gateway that transmitted said beacon or said succession of beacons was determined externally to said gathering gateway;
classifying said beacon or said succession of beacons responsive to the first, second and third information;
determining, responsive to said classification, whether to consider or not said beacon or said succession of beacons in order to determine the temporal reference for synchronizing in time and frequency said device vis-à-vis said communication system and determining, responsive to said classification, how to weight said beacon or said succession of beacons to determine the temporal reference for synchronizing in time and frequency said device vis-à-vis said communication system; and
determining, responsive to said classification, whether to consider or not said beacon or said succession of beacons in order to determine the spatial reference or references for determining the geolocation of said device and determining, responsive to said classification, how to weight said beacon or said succession of beacons to determine the spatial reference or references for determining the geolocation of said device; and based on said determinations, determining the temporal reference for synchronizing in time and frequency said device vis-à-vis said communication system and the spatial reference or references for determining the geolocation of said device.

14. A system comprising a device according to claim 13 and a gathering gateway configured to enable said device to determine a temporal reference and at least one spatial reference, the gathering gateway being intended to be included in a communication system comprising a plurality of such gathering gateways adapted for communicating with terminal devices by wireless communications, each of the gathering gateways being configured to transmit synchronization beacons in the communication system so as to enable devices receiving the synchronization beacons to synchronize in time and frequency vis-à-vis said communication system, wherein said gathering gateway implements in software form by execution of a set of instructions by a programmable machine or in hardware form by a machine or a dedicated component:
obtaining first information on current geolocation of said gathering gateway;
obtaining second information indicating what communication technology was used for determining the current geolocation of said gathering gateway;
obtaining third information indicating whether the current geolocation of said gathering gateway was determined internally in said gathering gateway, or whether the current geolocation of said gathering gateway was determined externally to said gathering gateway; and
transmitting the first, second and third information in a beacon or in a succession of beacons, so as to enable said device to use said information for determining the temporal reference for synchronizing in time and frequency vis-à-vis said communication system and the spatial reference or references for determining the geolocation of said device.

15. Non-transitory information storage medium storing a computer program comprising a set of instructions causing execution, by a processor of a gathering gateway configured to be included in a communication system, of the method according to claim 11, when said computer program is executed by said processor.

16. The method according to claim 1, wherein the current geolocation of said gathering gateway is obtained based on information received from a Global Positioning System (GPS) chip internal to said gathering gateway and the method further comprises applying a weighting factor to each retained beacon obtained or succession of beacons for determining the temporal reference for synchronizing in time and frequency said device vis-à-vis said communication system, and wherein each beacon transmitted by said gathering gateway and the current geolocation of which is obtained based on information received from the GPS chip is weighed according to a first weighting factor and each other beacon is weighed by a second weighting factor that is different from the first weighting factor.

17. A method for determining a temporal reference and at least one spatial reference, by a device in a communication system comprising a plurality of gathering gateways adapted for communicating with wireless communication terminal devices, each of the gathering gateways being configured to transmit synchronization beacons in the communication system so as to enable devices receiving the synchronization beacons to synchronize in time and frequency vis-à-vis said communication system, wherein the method is implemented by said device, and for each beacon in a plurality of beacons or for each succession of beacons in a plurality of successions of beacons respectively received from separate gathering gateways, the method comprises:
parsing said beacon or said succession of beacons and obtaining therefrom first information on current geolocation of the gathering gateway that transmitted said beacon or said succession of beacons;
parsing said beacon or said succession of beacons and obtaining therefrom second information indicating what communication technology was used for determining the current geolocation of the gathering gateway that transmitted said beacon or said succession of beacons;
parsing said beacon or said succession of beacons and obtaining therefrom third information indicating whether the current geolocation of the gathering gateway that transmitted said beacon or said succession of beacons was determined internally in said gathering gateway, or whether the current geolocation of the gathering gateway that transmitted said beacon or said succession of beacons was determined externally to said gathering gateway;
parsing said beacon or said succession of beacons and obtaining therefrom fourth information representing a resolution algorithm for determining the current geolocation of the gathering gateway that transmitted said beacon or said succession of beacons;
determining, responsive to the first, second, third and fourth information, whether to consider or not said beacon or said succession of beacons in order to determine the temporal reference for synchronizing in time and frequency said device vis-à-vis said communication system and determining, responsive to the first, second, third and fourth information, how to weight said beacon or said succession of beacons to determine the temporal reference for synchronizing in time and frequency said device vis-à-vis said communication system; and
determining, responsive to the first, second, third and fourth information, whether to consider or not said beacon or said succession of beacons in order to determine the spatial reference or references for determining the geolocation of said device and determining, responsive to the first, second, third and fourth information, how to weight said beacon or said succession of beacons to determine the spatial reference or references for determining the geolocation of said device; and
based on said determinations, determining the temporal reference for synchronizing in time and frequency said device vis-à-vis said communication system and the spatial reference or references for determining the geolocation of said device.

* * * * *